(12) United States Patent
Lauper (10) Patent No.: US 7,679,511 B2
(45) Date of Patent: Mar. 16, 2010

(54) METHOD FOR PROVIDING INFORMATION ON A PRODUCT

(75) Inventor: Eric Lauper, Bern (CH)

(73) Assignee: Swisscom AG, Bern (CH)

( * ) Notice: Subject to any disclaimer, the term of this patent is extended or adjusted under 35 U.S.C. 154(b) by 319 days.

(21) Appl. No.: 11/522,244

(22) Filed: Sep. 15, 2006

(65) Prior Publication Data

US 2007/0016479 A1 Jan. 18, 2007

Related U.S. Application Data

(63) Continuation of application No. PCT/EP2005/050911, filed on Mar. 2, 2005.

(30) Foreign Application Priority Data

Mar. 16, 2004 (EP) .................................. 04101080

(51) Int. Cl.
*G08B 13/14* (2006.01)

(52) U.S. Cl. ............ 340/572.1; 340/568.1; 340/539.13; 340/10.42

(58) Field of Classification Search ... 340/572.1–572.9, 340/568.1, 10.1, 825.36, 825.49, 10.4, 10.41, 340/5.8, 5.86, 10.51, 10.42, 539.11, 539.13; 235/435, 462.01, 454, 439
See application file for complete search history.

(56) References Cited

U.S. PATENT DOCUMENTS

| | | | |
|---|---|---|---|
| RE33,054 E * | 9/1989 | Markham | 235/385 |
| 6,332,572 B1 * | 12/2001 | Yamamoto et al. | 235/382 |
| 6,400,272 B1 * | 6/2002 | Holtzman et al. | 340/572.1 |
| 6,434,671 B2 * | 8/2002 | Chung | 711/129 |
| 6,601,762 B2 * | 8/2003 | Piotrowski | 235/382 |
| 6,758,397 B2 * | 7/2004 | Catan | 235/385 |
| 7,116,244 B2 * | 10/2006 | Fling et al. | 340/870.26 |
| 7,233,958 B2 * | 6/2007 | Weng et al. | 707/104.1 |

(Continued)

FOREIGN PATENT DOCUMENTS

EP  1 054 335 A2  11/2000

(Continued)

OTHER PUBLICATIONS

"Design of Enterprise Web Servers in Support of Instant Information Retrievals" 2003 IEEE International Conference on Systems, Man and Cybernetics. SMC '03 Conference Proceedings. Washington D.C. Oct. 5-8, 2003.

*Primary Examiner*—Daniel Previl
(74) *Attorney, Agent, or Firm*—Pearne & Gordon LLP (57) ABSTRACT

A method for obtaining information on a product (1), said method comprising the following steps: the product (1) is marked with several codes (100, 101) that are stored in one or several RFID tags (11, 11'); at least one of said codes is read contactlessly by means of an RFID reader device (2); said reader device (2) sends a set of one or several read codes to a name service server (6) over a telecommunication network (4); said name service server (6) answers with the address of one or several hypertext pages; and the sought information (7) is accessed by means of said hypertext pages. The invention is characterized in that not all codes (100, 101) read by the RFID reader device are contained in the set sent, and in that the code or codes (100, 101) contained in said set are selected in said reader device (2).

26 Claims, 3 Drawing Sheets

U.S. PATENT DOCUMENTS

| | | | |
|---|---|---|---|
| 7,336,174 B1 * | 2/2008 | Maloney | 340/572.1 |
| 7,341,199 B2 * | 3/2008 | Dunlap, Jr. | 235/492 |
| 2002/0116268 A1 | 8/2002 | Fukuda | |
| 2004/0046642 A1 | 3/2004 | Becker et al. | |
| 2005/0242921 A1 * | 11/2005 | Zimmerman et al. | 340/5.2 |

FOREIGN PATENT DOCUMENTS

| | | | |
|---|---|---|---|
| EP | 1 191 448 | * | 2/2001 |
| EP | 1 191 448 A1 | | 3/2002 |

* cited by examiner

METHOD FOR PROVIDING INFORMATION ON A PRODUCT

REFERENCE DATA

This application is a continuation of International Patent Application PCT/EP2005/050911 (WO2005/088516) filed on Mar. 2, 2005 under Convention priority of European patent application EP04101080.2 of Mar. 16, 2004, the contents whereof are hereby incorporated by reference.

TECHNICAL FIELD

The present invention concerns a method with which information and services can be made available to a user as well as an RFID tag according to the independent claims.

STATE OF THE ART

Methods are already known for obtaining information on a product on the basis of a so-called RFID element (or tag). For this, certain tags have a memory area that can be read contactlessly with an RFID reader device and in which the sought information is stored. Since the price of the tag depends strongly on the size of the memory, such tags are used especially when only little information is required; for example, the product manufacturing date, a serial number, etc. US-A1-2004/046642 describes for example an RFID reader device and a plurality of RFID tags to be read.

Other methods are also known wherein the sought information is retrieved from an external database in which information concerning several tags is stored. In this case, a code is read in the tag and used as search criteria in the external database from which the sought information is retrieved. For this, the link between a product and the set of data in the database is static and permanent; a product marked with a tag will always give access to the same information.

However, different users often need different information. A product manufacturer for example wishes to know when the product was manufactured whilst an end user is perhaps more interested in the expiry date. Certain information must possibly remain confidential vis-à-vis certain users. Usual methods using cheap read-only tags do not offer this required security and flexibility.

The address of the database in which the sought information is stored must furthermore be known to the reader device and within reach of it. A change of this address is only possible if all users have been informed, which further limits the possibilities for use.

Often, the information linked to a tag must be updated or completed several times. This can for example occur by writing new information or a new code in the tag's memory, which is only feasible in the case of an expensive re-writable tag, where the tag must furthermore have sufficient memory. Such tags are often ten to fifty times more expensive than conventional read-only tags.

It is also possible at any time to update in the external database the set of data corresponding to the tag. If however several different partners wish to modify this information, they all have to have a writing right to said area of the database, which is more often than not undesirable for security reasons.

European patent application EP-A2-1 054 335 describes a method and a system wherein physical or electronic objects are provided with a code. The code is recorded by a reader device, for example by a camera. Thanks to the recorded code, an Internet address is determined in a database and this Internet address is accessed with the aid of a browser. The disadvantage is that only a single code is determined, which is difficult to update.

EP-A1-1 191 448 describes a system wherein a communication device can access an advertisement, a poster etc. through an RFID interface. It thus contains the URL address and access the page directly over Internet. Since URL addresses are often changed or updated, the question arises as to how this is updated in the RFID tags.

US-A1-2002/116268 describes a system in which information is determined by means of an RFID interface. A mobile communication device provided with the RFID interface directly reads the Internet or e-mail address and uses the Internet to receive the sought information. The disadvantages indicated for EP-A1-1 191 448 also apply here.

REPRESENTATION OF THE INVENTION

It is an aim of the present invention to propose a new method and a new tag with which these problems can be solved.

It is another aim to propose a new method for providing information on a product, wherein sufficient security and flexibility is also possible with cheaper read-only tags.

It is also an aim of the present invention to propose a method for providing information on a product, wherein the offered information can be updated and completed at any time without new data having to be written in the tags.

It is also an aim of the present invention to propose a method wherein the electronic address of the memory area in which the sought information is stored can be changed without having to inform all the users of reader devices.

Another aim is also that different users, or a same user in other circumstances, can access different information.

These aims are achieved in particular with a method according to the preamble of claim 1 in that a subset of codes read by the RFID reader device is contained in said sent set and in that the code or codes contained in said set are selected in said reader device.

The aims are also achieved with an RFID tag according to the independent device claim.

This has among others the advantage that the sought information or desired service is made available over an editable electronic hypertext page.

The address of the page corresponds to the code read in the RFID tag. The connection between the code and the page's electronic address is not static but is recorded in a name service server. This has the advantage that changes of the page address are possible at any time and easily traceable. This also has the advantage that it is a universal system in which information can be ordered from every mobile device in every network over a single address of the server.

The selection of the code linked with a product or of a certain set of codes is effected manually or automatically in the reader device. This has the advantage that different users (or a same user in different conditions) can access different information by using different codes or sets of codes. Since the used codes are selected only after they have been read, no pre-knowledge about the codes present in the tag are required. Some information can furthermore be reserved to users able to read and present sets with several codes, which makes possible new possibilities for use, in particular for security-critical applications.

The selected set of codes includes a subset of read codes. Depending on the selection of the reader device, this subset can include at least one code (or even no code) and at most all read codes. The number of the used codes is determined with the reader device.

BRIEF DESCRIPTION OF THE FIGURES

The present invention will be described hereinafter in more detail on the basis of the figures, which show.

WAYS OF EXECUTING THE INVENTION

Figure 1:
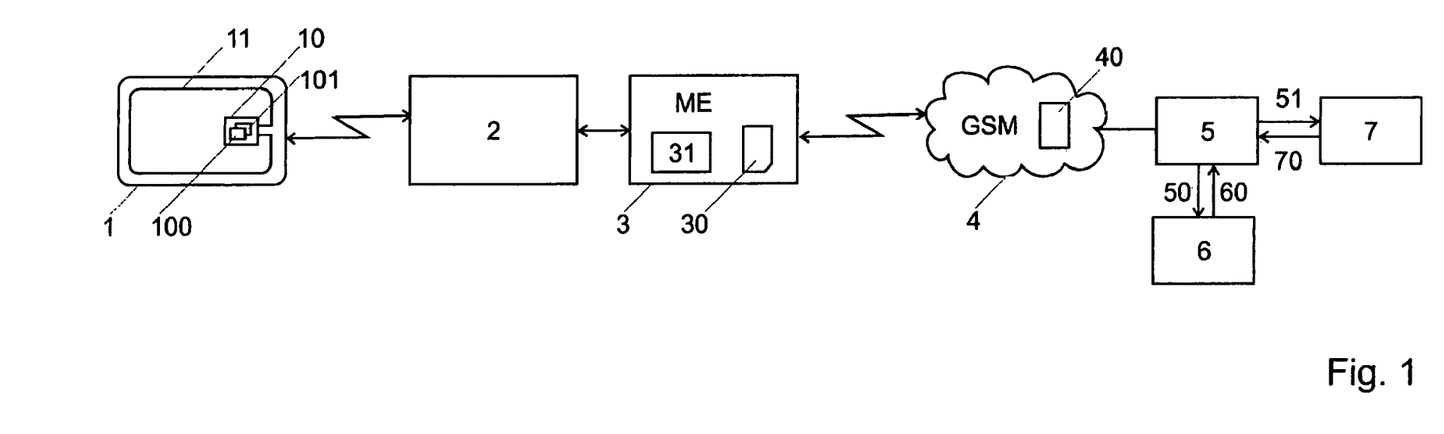
FIG. 1 a block diagram of a system with a mobile device, an RFID reader device, an RFID tag and a remote server.

FIG. 1 shows the system used by a user (for example a mobile subscriber) for ordering services or information with the inventive method. A mobile device 3 (for example a mobile radio telephone or a PDA with an interface for a cellular mobile radio network) can receive from a mobile radio network 4 and send to this network short messages (for example SMS and USSD) and data (for example IP packets). The mobile radio network 4 is for example a GSM, GPRS, HSCSD, EDGE, UMTS or CDMA network over which data can also be transmitted. The mobile device 3 contains an identification module (for example a SIM card 30) for identifying the device through the network respectively at the network 4. One or several software applications 31 can be executed by a processor in the mobile device 3.

The mobile device 3 further includes an RFID reader device 2 or is connected with such a reader part (for example over a USB, Firewire, PCCard, Compactflash, proprietary etc. connection or over a Bluetooth or WLAN contactless connection). The reader device 2 includes a micro-controller and at least one antenna or coil for exchanging data contactlessly with RFID components (tags) in a product 1 in the immediate vicinity. The data transmission occurs preferably in the frequency range 13.56 Mhz, 900 Mhz and/or 860-930 Mhz. The reader part can preferably be chosen to work in different frequency ranges and with different RFIDs. The operational range for reading the RFID is preferably between 2 and 10 meters—depending on the orientation of the reader part and of the tag. The connection preferably occurs in half-duplex mode with an ASK backscatter modulation. The tag is preferably powered by the reader device 2 and thus does not require an independent power source.

Figure 2:
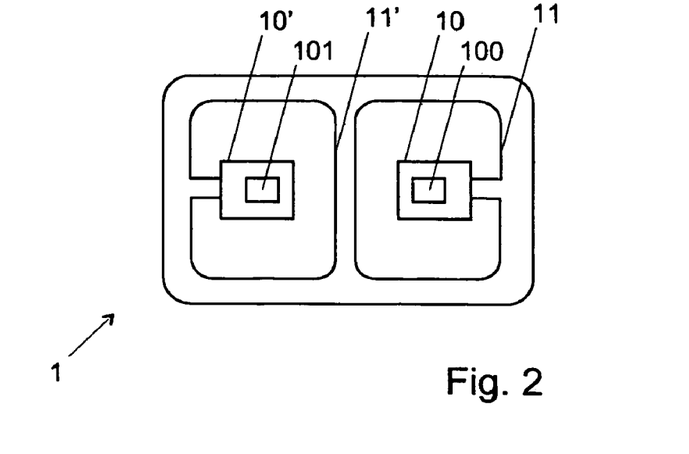
FIG. 2 diagrammatically a product with several RFID tags operating independently.
Figure 3:
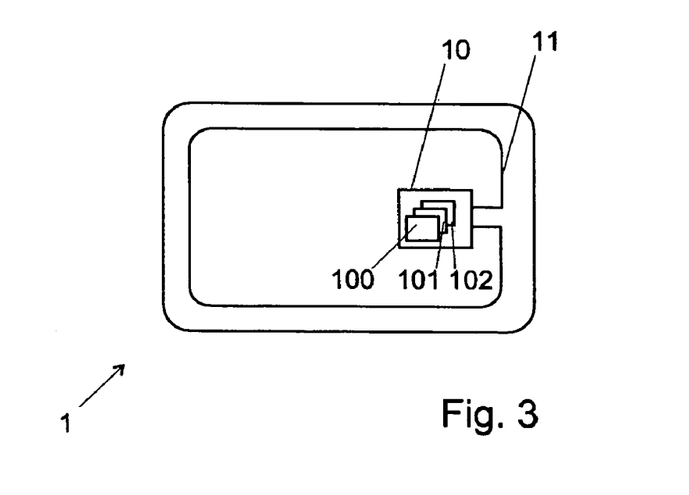
FIG. 3 diagrammatically a product with an RFID tag in which several codes are stored.

The product 1 includes one or several tags 11. FIG. 2 shows a product 1 with two tags 11, 11' with the chips 10, 10'. FIG. 3 shows a product with a single tag 11.

Each tag 11, 11' includes at least one chip 10, 10' and an antenna. Each chip 10, 10' of FIG. 2 has a permanent memory area in which a code 100 resp. 101 etc. is stored during manufacture or during personalization of the chip. In the embodiment of FIG. 3, several codes 100, 101, 102 are stored in the same chip 10.

Figure 4:
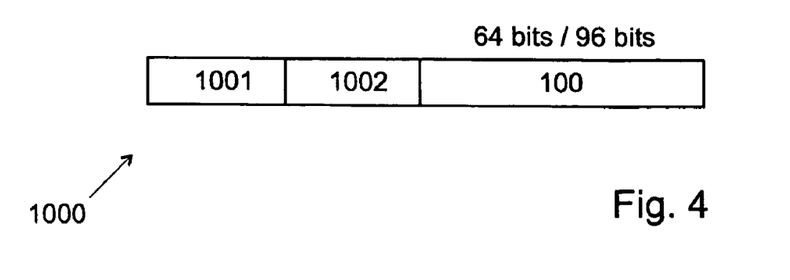
FIG. 4 the structure of a message with a code according to the invention.

The codes 100, 101, 102 preferably include 64, 96 or more bits and are organized hierarchically. The answer 1000 of the tag 11 to a query of the reader device 2 preferably includes a header 1001, redundant verification data 1002 and only then the code 100, 101 or 102 (FIG. 4) or at once all the codes in the tag. Several codes in a product in the vicinity of the reader device 2 can also be reach one after the other. The query of the reader device 2 can indicate a number range and each tag 11 resp. each chip 10, 10' decides on the basis of this number range with which code or codes it will answer this query. A tag 11 in which several codes are stored can for example answer a certain query with only one code or with a limited number of codes. A tag can also reproduce the available codes separately with a time interval for security reasons.

Other data can be stored in the memory area of the chip 10 and be read by the reader part.

The chip 10, 10' is preferably a read-only chip that can be produced at low cost and in a small size; two read-only chips are often less expensive than a single re-writable chip. Re-writable chips can however also be used within the frame of the invention.

Codes 100 are preferably distributed by a common authority to different product manufacturers, mobile radio network providers and value added service providers; part of the code preferably indicates the identity of the provider of the product 1. The product provider reserves a series of codes from the common authority and stores part of these codes in tags 10, 10' that are then distributed with the products. A product can be provided by several organizations with different tags.

At least one application 31 is provided in the mobile device 3 for reading codes 100, 101, 102 in neighboring tags over the reader device 2 and for deciding which have to be used for ordering further information or services, as will be described later.

Reading a code is preferably initiated by the mobile device 3; it is possible for example that the mobile device continuously or periodically searches for neighboring tags and reads, processes or forwards the codes in found tags. In another, low-current embodiment, reading is initiated by the user of the mobile device 3 that launches a corresponding application 31 or enters a command if he wishes to read a tag. Reading the tag with the mobile device 3 or with another device can also be initiated by an external device (for example a selling point or an automatic machine) over an interface at close range (for example Bluetooth or WLAN) over the mobile radio network 4 or over a link on a visited WEB or WAP page.

Simple filters and processing means can be provided as part of the application 31 in the mobile device 3 and/or in the reader device 2, in order to select and process a set of codes from among the (several) read codes 100. The application can for example process and forward only certain code parts. Redundancy checks can also be provided to delete codes that are not plausible or that contain errors. Previously used codes are preferably stored in a database in the mobile device 3 for the purpose of future controls, statistic evaluations and backups.

According to the application 31, a password or another authentication can also be requested before the set of codes selected according to the invention is read or forwarded. The password can for example be printed on a hidden part of the product 1 that can be uncovered or is communicated to the mobile user over another channel. The selection of the used codes can in this case depend on the list of the known passwords.

In one embodiment, the password consists of part of the code 100, 101, 102 or can be determined from this code with a function. The password can for example result from a signature of the code that can be verified with a public key. In this case, the password can be determined from the code only if the unauthorized third party knows the corresponding function or the private signing key. This embodiment has the advantage that the application 31 can verify the validity of the password merely on the basis of the code.

In another embodiment, the validity of the password is verified on the basis of a table in the SIM card 30, in the mobile device 3 or in the external server.

In yet another embodiment, the password is stored in the tag 11 and verified by the tag. This embodiment however requires more complex tags that have data processing means for storing, receiving and comparing passwords.

The set of codes read in the tag 11 and selected by the mobile device 3 resp. by the reader device 2 is packaged by the application 31 in an order message (for example in a short message or preferably in a GPRS or UMTS packet) and sent over the mobile radio network 4 to a server 5 at a known address, preferably a server within the infrastructure 40 of the mobile radio network 4 (FIG. 1). The service order message is optionally signed and/or provided with a time stamp by the mobile device 3 or by the SIM card 30.

The server 5 administers order messages with sets of codes that are received from several or possibly all RFID reader devices 2. Other, more complex filters can be provided in the server 5 in order to handle codes from different areas differently or not at all.

A password can also be required by the server 5 for the received code or sets of codes to be processed at all; like in the mobile device, this password can bee derived from the code itself or can be verified on the basis of a table. The password is for example transmitted to the server 5 in a message together with the code 100, 101 or separately in the framework of a dialogue.

The server 5 can also verify the identity of the user of the mobile device 3. This is all the more reliable if the server 5 is administered by the operator of the mobile radio network 4. In this case, the identity of the mobile user can be determined reliably for example on the basis of the IMSI (International Mobile Subscriber Identity) or of another identity in the SIM card. Access to certain information and services is granted only to certain users (for example mobile users having a corresponding subscription, having a sufficient balance on a money account, or whose profile allows the supplying of the service).

If the password is wrong or if the sought information or desired service cannot be made available for any other reason, a message is preferably sent to the user (for example over SMS, USSD or Internet). After several failed attempts, further attempts can be blocked definitively or temporarily for security reasons. In this manner, it is possible to prevent that valid codes can be guessed through repeated trials.

The server 5 is connected over Internet or an intranet with a name service server 6 in which for each code a corresponding electronic address of an electronic hypertext page is stored. In a variant embodiment, certain sets from several codes are also allocated to a page.

A query 50 with the code 100, 101 just received is directed by the server 5 to the name service server 6, which answers with the corresponding electronic address (answer 60). The electronic address consists for example of an URL or another address for a TCP-IP network.

The name service server 6 can be administered by the operator of the server 5 and/or by external entities (for example by the organization distributing the codes 100 to the different companies). Several name service servers can be connected with one another so that the desired address is sought in another name service server if it is not found in the server 6. This allows for example a mobile radio network operator to process also codes from other organizations. A local cache of an external name service can also be provided in the server 5 or in the domain of the server 5; this cache can for example contain only the addresses corresponding to the codes 100 that are located in the value cards of the mobile radio network operator.

The user of the mobile device 3 can thus always send all sets of codes 100, 101, 102 of all service providers to the same target server 5, that determines from the name service server 6 or from the network of name service servers 6 the address of the page on the basis of which the sought information or desired service is made available. Processing the order message thus depends only on the code in the message. Similar messages that reach different servers 5 of several service providers can thus cause the same service or information to be made available.

The connection in the name service server 6 between a code or set of codes 100 and an address can preferably be modified anytime by the provider of the sought information (for example over a dedicated WEB form). This allows the electronic address of a page or of a domain to change without having to inform the end users.

The address of the desired page can thus be found only and univocally on the basis of the codes or sets of codes stored in the tag 11; the page that is accessed is thus completely independent from the address or telephone number of the server 5. Since many products and value cards must be marked, and since for security reasons not all codes can be used, enough freely available bits must be provided for the codes; simple IP numbers for example would possibly not suffice since very many possible combinations have already been allocated. Another, independent page addressing system is preferably used.

The server 5 receives the answer 60 from the name service server 6 with the desired page address and accesses the corresponding page in the server 7 or a network with several local or remote servers (query 51 and answer 70 in FIG. 1).

In one embodiment, the address of the desired page results from a combination of the address indicated by the name service server 6 with one or several bits of the code 100. In this case, the address in the name service server 6 corresponds to an area in which the individual pages correspond to certain parts of the code. This has the advantage that the name service server 6 can be designed more easily.

In a further embodiment, the address of the desired page results from a combination of several addresses indicated by the name service server 6 and which correspond to several different codes in a set. A first code in a set can for example correspond to a domain whilst a second code corresponds to a particular page in this domain. Some information is thus reserved to users able to read and present several codes, for example users that can thus prove that they have two specific tags.

The several codes in the tag resp. on the product can be written by one or several information providers in one or several steps.

The page in the server 7 accessed by the server 5 possibly includes a hypertext content in a markup language. In one embodiment, this page comprises an XML (extended Markup Language) content. In another embodiment, the page includes a PML (Product Marking Language) content. The page can also support SOAP protocol (Simple Object Access Protocol), .NET Framework or other web services with which the server 5 and finally the mobile device 3 can access services and objects of the server 7. In this case, the inventive method includes making available executable program code elements or SOAP and/or .NET services.

The server 5 downloads the desired page from the server 7 and/or accesses the desired service (or the object at the indicated address) in order to make the desired service or information available to the user of the mobile device 3. The user can for example reproduce the sought information with a normal browser.

We will now describe how a certain set of codes can be selected in the mobile device 3 or in the RFID reader device 2.

In a first embodiment, that will be described in more detail on the basis of FIG. 5, all codes available in close tags are first read by the RFID reader device 2 and displayed in a menu from which the user can select a set with one or several codes. The search for available codes that are read can also be restricted in a predefined number range. In the represented example, a menu is displayed with three codes found in tags in close vicinity, from which the user can select one or possibly several codes in order to access the corresponding sought information or desired service.

Depending on the code allocation by the competent authority, additional information can also be directly determined by the mobile device 3 from the read codes and displayed in the menu, to facilitate the code selection. It is for example conceivable for the nationality or the identity of the organization competent for a certain code to result directly from the code, knowledge gained from previous reading processes being also usable.

The read codes can be sent immediately to the server 5 or stored in the memory of the mobile device 3 for a later use.

Figure 6:
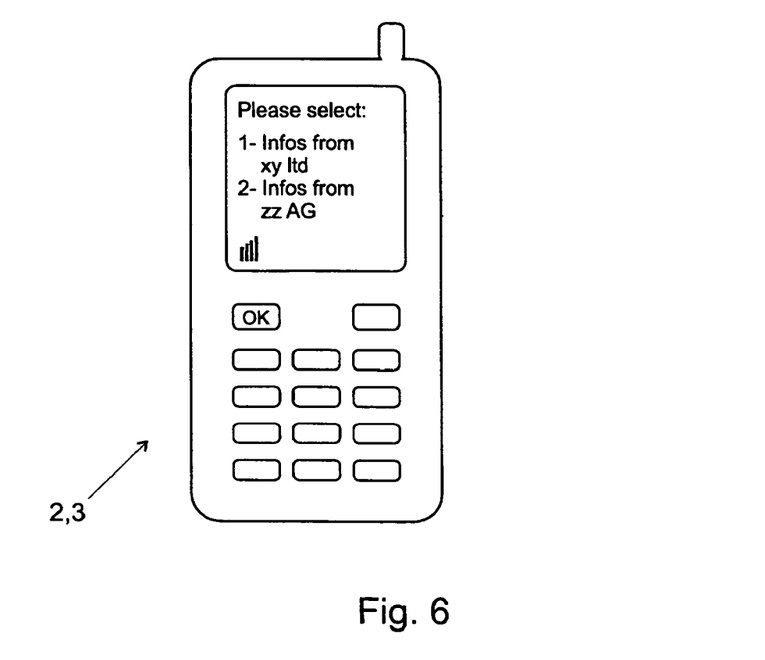
FIG. 6 diagrammatically a reader device 2, 3 with which a code is selected according to a second embodiment of the method.

In the embodiment illustrated in FIG. 6, the menu of read codes already contains incomplete information gained from the remote server 5 or 7. In the figure, for each code read at close range, the name or the identification of the competent code issuer is indicated that has been stored in the remote server 7 and retrieved before the menu is displayed. This makes the selection considerably easier for the user. Complete information regarding the selected code can be transmitted from the remote server 7 by selecting the corresponding option in the menu. Displaying the first information in the menu can be free of charge whilst only the downloading of the complete selected information is possibly billed.

Figure 5:
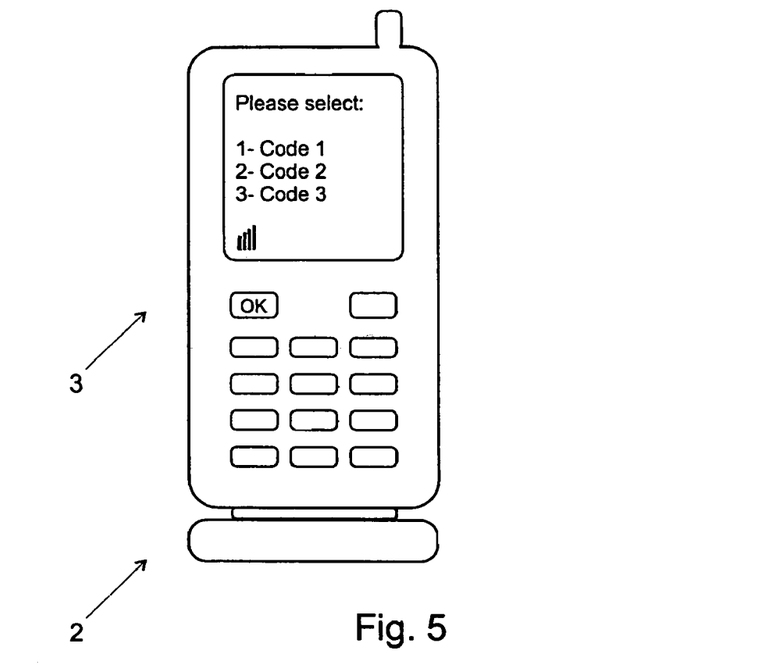
FIG. 5 diagrammatically a reader device 2, 3 with which a code is selected according to a first embodiment of the method.

FIGS. 5 and 6 show a variant embodiment with a text menu. Other possibilities for selecting a menu option are possible within the frame of the invention; it is for example also possible to use graphical menus or voice menus.

The reader device 2 scans all tags that can be reached in order to access the corresponding codes and display them in a menu. The list of read codes can be restricted prior to displaying the menu on the basis of predetermined user preferences or profiles. It is also possible for a particular code or a particular set of codes to be selected automatically and without the user intervening. The following previously known criteria can for example be used for determining the selected set of codes or the code selection offered in the menu:

User preferences and/or user profiles determined either explicitly or implicitly from previous decisions of the user.

Identity of the user. This identity can for example be determined on the basis of a chip card available in a mobile device 3. The mobile subscriber identity MSISDN (Mobile Station Integrated Services Digital Network) or IMSI (International Mobile Subscriber Identity) can for example be used. Users can also be gathered in groups having different preferences or rights. Different users thus access different codes or sets of codes.

Other data stored in the chip card (SIM card 30) or in the mobile device 3.

Location of the user, that can be determined with a location determining module in the mobile device or within the mobile radio network infrastructure 40. In this manner, a user can use another code and thus access different information depending on his location.

Time, for example absolute time, day of the week, season, time elapsed since a particular event, etc.

Code value or number range in which the read codes are. The users can thus for example determine that they wish to use only codes within certain number ranges.

Available amount on a money account accessible to the mobile device 3. Access to the information allocated to particular codes can be billed to the user and a user can for example determine in his preferences that he only wishes to use codes if he can pay this with his prepaid account on his SIM card 30.

Parameters determined from the infrastructure 40 of the mobile radio network 4, including time, user location, preferences of the mobile radio network operator, etc.

Parameters gained from the remote server 7 prior to displaying the menu in order for example not to display in the menu information in foreign languages or information at a discount price.

Context of the code reading. Other codes can for example be used depending on whether access is initiated by the user or by an external device.

Earlier accesses of the user to certain information. Codes corresponding to an already read page or codes for which a password has already been entered wrongly several times are no longer offered in the menu.

Etc.

The user of the mobile device, or the mobile device 3 alone, can thus select an available code or a set of codes in order to access the corresponding information.

This method thus allows a user to decide which information allocated to a product he wishes to access. Making available various information can call for other access rights or can be billed differently. Other information is only available if a user can prove that he has a product in which two codes are stored in one or several tags.

In the represented example, the tags include at most three codes. In the frame of the invention it is however also possible to use tags with considerably more codes, for example dozens, hundreds or thousands of codes. In this manner, a TV menu can be stored in a tag in which a code is stored for each program. The user reads all the codes in the desired number range (corresponding for example to a time interval) and can order from the remote server 7 more information or ordering parameters about the selected programs.

REFERENCE LIST

1 Product
10 Chip
10' Chip
11 Tag
11' Tag
100 Code
101 Code
102 Code
1000 Answer
1001 Header
1002 Verification data
2 RFID reader device
3 Mobile device
30 SIM card
31 Applications 4 Mobile radio network
40 Mobile radio network infrastructure
5 Server
50 Query
51 Query
6 Name service server
60 Reply
7 Server
70 Reply

The invention claimed is:

1. Method for obtaining information on a product, comprising the following steps:
   marking the product with several codes that are stored in one or several RFID tags;
   reading a plurality of said codes contactlessly by an RFID reader device;
   selecting one or more codes for said plurality of said read codes by the RFID reader device, wherein said selecting is automatically performed by a process unit of the RFID reader device depending on previously known criteria;
   creating a package of said set of selected one or more codes by the process unit of the RFID reader device;
   said reader device sending said package to a name service server over a telecommunication network;
   the name service server responding with an address of one or several hypertext pages based on said package, wherein
   said information is provided by means of said hypertext pages.

2. The method of claim 1, wherein said reader device has user identification means, and wherein said selected code or codes depend on the identity of said user.

3. The method of claim 1, wherein said reader device has a chip card for identifying the user, and wherein the selected code or codes depend on the contents of said chip card.

4. The method of claim 1, wherein said reader device has location-determiningmeans, and wherein the selected code or codes depend on the user location.

5. The method of claim 1, wherein said reader device has time-determining means, and wherein the selected code or codes depend on the time.

6. The method of claim 1, wherein a profile of the user is accessible to said reader device, and wherein the selected code or codes depend on said profile.

7. The method of claim 1, wherein the code or codes are selected depending on their value.

8. The method of claim 1, wherein an electronic money account is accessible to said reader device, wherein said money account is debited in order to access said information, and wherein codes are only selected if this can be paid with the money account.

9. The method of claim 1, wherein said reader device consists of a mobile device or is connected with a mobile device, and wherein said telecommunication network is a cellular mobile radio network in which said mobile device is connected.

10. The method of claim 9, wherein said mobile radio network has a central infrastructure, and wherein said selected code or codes depend on parameters determined from said infrastructure.

11. The method of claim 1, wherein said product contains several codes, and wherein said set contains one of said codes.

12. The method of claim 1, wherein said product has several tags with one code each.

13. The method of claim 1, wherein said product has at least one tag with several codes.

14. The method of claim 1, wherein said reader device reads several said reachable codes and then selects a set from the read codes.

15. The method of claim 1, wherein said reader device reads said reachable codes and interrupts the scanning for other codes as soon as a suitable set of codes has been found.

16. The method of claim 1, wherein a password is requested in order to access the information connected with at least certain codes, and wherein said password requested for different codes is different.

17. The method of claim 1, wherein certain information is reserved for users that read and present several codes.

18. An RFID device for obtaining information on a product, comprising:
   an RFID tag having a read-only memory area; and
   an RFID reader device having a process unit;
   wherein several different codes are stored in said read-only memory area,
   wherein each one of said codes have an equal number of bits and can be selected by the process unit of the RFID reader device depending on previously known criteria thereby serve as an indicator for a name service server, and
   wherein all of said codes can be read from said RFID reader device over the same RFID interface.

19. The RFID device of claim 18, wherein only said codes can be read over said interface.

20. Method for obtaining information on a product, said method comprising the steps of:
   marking the product with several codes that are stored in one or several RFID tags;
   reading a plurality of said codes contactlessly by an RFID reader device;
   selecting one or more codes for said plurality of said read codes by the RFID reader device, wherein said selecting is automatically performed by a process unit of the RFID reader device depending on previously known criteria;
   sending said set of codes, using the RFID reader device, to a server over a telecommunication network;
   requesting transmission of a password; and
   in response to receiving said password and said set of codes, providing the information on the product via one or several hypertext pages.

21. The method of claim 20, wherein the information provided is dependent upon matching the password to a password associated with one of the codes in said set of codes.

22. Method for obtaining information on a product using a reader device comprising user identification means, said method comprising the steps of:
   marking the product with several codes that are stored in one or several RFID tags;
   reading a plurality of said codes contactlessly by an RFID reader device;
   selecting one or more codes for said plurality of said read codes by the RFID reader device, wherein said selecting is automatically performed by a process unit of the RFID reader device depending on previously known criteria;
   wherein said selected code or codes in said set of codes depend on either the identity of the user or depend on information stored in an identification unit of the RFID reader device;
   sending said set of codes, using said reader device, to a name service server over a telecommunication network; and
   providing an address of one or several hypertext pages using the name service server, wherein said information is provided by means of said hypertext pages.

23. Method for obtaining information on a product, comprising the steps of:

marking the product with several codes that are stored in one or several RFID tags;

reading a plurality of said codes contactlessly by an RFID reader device;

selecting one or more codes for said plurality of said read codes by the RFID reader device, wherein said selecting is automatically performed by a process unit of the RFID reader device depending on previously known criteria; wherein a profile of the user is accessible to said reader device, and wherein the selected code or codes depend on said profile;

sending said set of codes, using said RFID reader device, to a name service server over a telecommunication network;

providing the address of one or several hypertext pages using the name service server, wherein said information is provided by means of said hypertext pages.

24. Method for obtaining information on a product, comprising the steps of:

marking the product with several codes that are stored in one or several RFID tags;

reading a plurality of said codes contactlessly by an RFID reader device;

selecting one or more codes for said plurality of said read codes by the RFID reader device, wherein said selecting is automatically performed by a process unit of the RFID reader device depending on previously known criteria; wherein the selected code or codes depend on location of a user and/or a money account accessible by the mobile reader device;

said reader device sending said set of codes, using the RFID reader device, to a name service server over a telecommunication network;

providing the address of one or several hypertext pages using the name service server, wherein said information is provided by means of said hypertext pages.

25. Method for a user to obtain information on a product, comprising the following steps:

marking the product with several codes that are stored in one or several RFID tags;

reading a plurality of said codes contactlessly using an RFID reader device;

displaying said plurality of said read codes to the user by the RFID reader device;

manually selecting, by the user, one or more codes from said plurality of said displayed codes using the RFID reader device;

creating a package of said set of selected one or more codes by the RFID reader device;

said reader device sending said package to a name service server over a telecommunication network;

the name service server responding with an address of one or several hypertext pages based on said sent package, wherein said information is provided by means of said hypertext pages.

26. The method of claim 25, wherein said plurality of said read codes are displayed with incomplete information gained from said hypertext page.

* * * * *